March 25, 1952 E. J. DORNATH 2,590,388
TOY LOGGING TRUCK AND TRAILER
Filed Oct. 26, 1949 2 SHEETS—SHEET 1
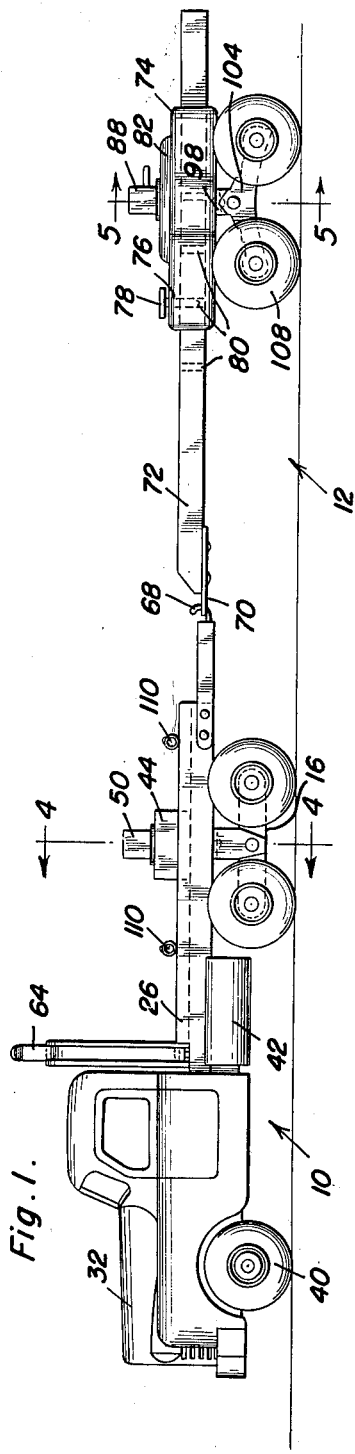
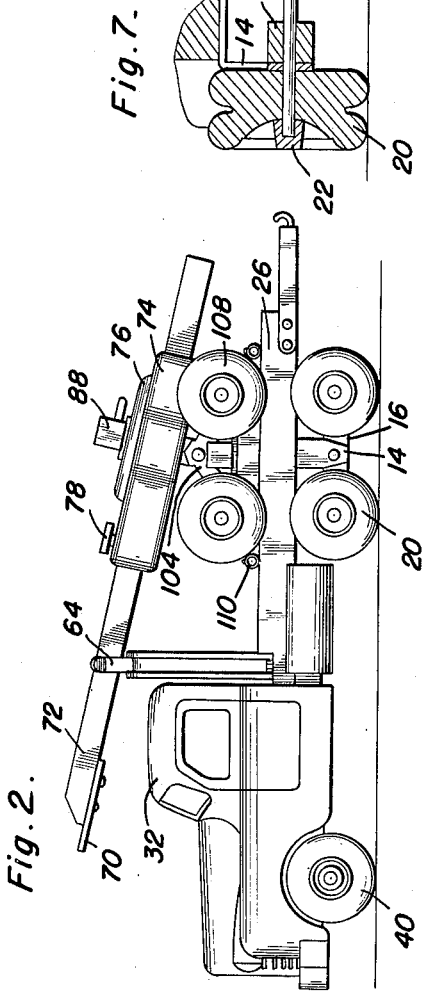
Inventor
Enno J. Dornath
By Clarence A. O'Brien
and Harvey B. Jacobson
Attorneys March 25, 1952  E. J. DORNATH  2,590,388
TOY LOGGING TRUCK AND TRAILER
Filed Oct. 26, 1949  2 SHEETS—SHEET 2
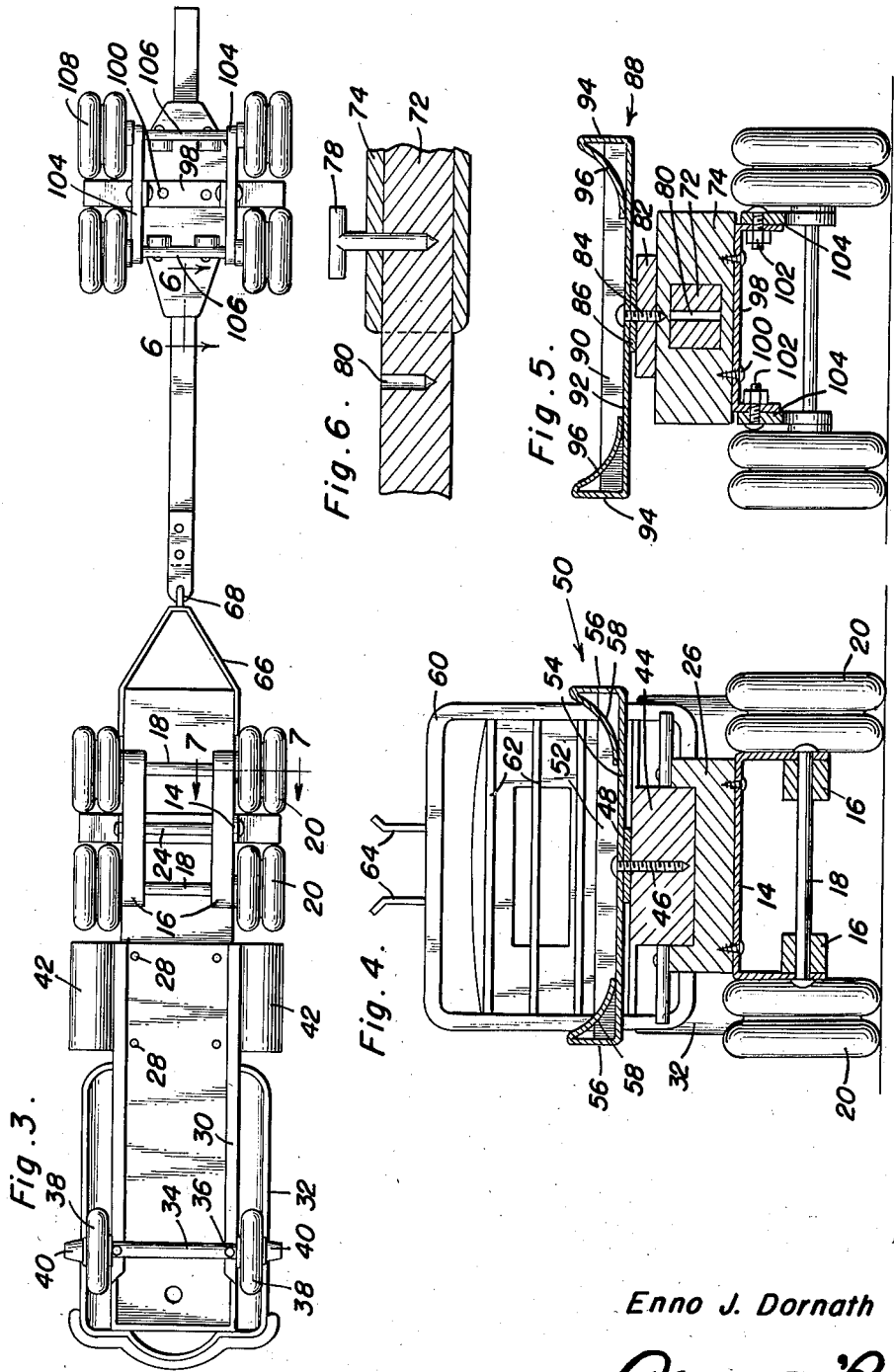
Inventor
Enno J. Dornath
By Clarence A. O'Brien
and Harvey B. Jacobson
Attorneys Patented Mar. 25, 1952

2,590,388

UNITED STATES PATENT OFFICE 2,590,388

TOY LOGGING TRUCK AND TRAILER

Enno J. Dornath, Coquille, Oreg.

Application October 26, 1949, Serial No. 123,552

1 Claim. (Cl. 280—33.2)

This invention relates to the class of toys, and more particularly to a toy truck and trailer therefor which are adapted to be detachably coupled together.

An object of the present invention is to provide a toy vehicle adapted to simulate a logging truck and trailer now used for highway transportation.

A further object of the invention is to provide means on the truck body for removably supporting the trailer thereon when the toy is being stored or when it is being transported from one location to another.

Yet another object is to provide the novel truck and trailer unit with supporting means for logs and the like which will pivot relatively to the angular displacement of the truck relative to the trailer so as to continuously maintain the logs or other load carried by the truck and trailer as a substantially secure load which is less likely to fall off the vehicle.

Still further objects reside in the provision of a toy logging truck and trailer combination which is extremely attractive in appearance, strong, durable, and resistant to destruction by a child, colorful, realistic in its simulation of authentic vehicles even though provided with novel means for storage and the like, simple and inexpensive to manufacture, and quite safe as a toy for a child of any age.

These, together with the various ancillary objects of the invention which will become apparent as the following description proceeds, are attained by this toy logging truck and trailer, a preferred embodiment of which has been illustrated, by way of example only, in the accompanying drawings, wherein:

Figure 1 is a side elevational view of the truck and trailer unit shown in position adapted to have a load secured thereon;

Figure 2 is a side elevational view of the trailer and truck showing the trailer secured on the truck while the toy is being stored or in transportation from one location to another site;

Figure 3 is a bottom plan view of the invention as shown in Figure 1;

Figure 4 is a vertical sectional view as taken along line 4—4 in Figure 1, and being enlarged for the greater detail thereof;

Figure 5 is a vertical sectional view as taken along line 5—5 in Figure 1, this view also being in an enlarged scale for greater detail;

Figure 6 is an enlarged sectional detail as taken along line 6—6 in Figure 3; and Figure 7 is a vertical sectional view as taken along line 7—7 in Figure 3.

With continuing reference to the accompanying drawings wherein like reference numerals designate similar parts throughout the various views, reference numeral 10 generally designates a toy truck and reference numeral 12 generally designates a toy trailer, which parts in combination form the toy log truck and trailer comprising the present invention.

Referring now more particularly to the truck element or unit of the present invention, it will be seen that such truck is provided with a suitable chassis comprising a frame 14 from which are suspended opposed pairs of longitudinally extending bogies 16 having axles 18 securely emplaced therebetween. On the ends of the axles 18 are journaled wheels 20 which are held in place on the axles by suitable caps 22. The axles 18 are secured to the bogies by means of suitable pins and are prevented from rotating therein. A pin 24 is used to pivotally support the bogies in spaced relationship from the frame 14. The wheels 20 are so shaped and colored as to simulate a suitable double tired double wheel of a conventional truck.

A truck body 26 of desired configuration is supported by the chassis and is secured to the frame 14. Rigidly secured by screws 28 to the truck body is the frame 30 of the cab 32 adapted to simulate an actual cab of a conventional truck. An axle 34 is bolted as at 36 to the frame 30 and is provided with a pair of wheels 38 oppositely disposed and held on the axle 34 by caps 40. For more realism, gas tanks 42 are secured to the frame 30 of the truck.

A turning block 44 is glued or elsewise secured to the truck body 26. By means of screw 46 and washer 48 a pivotal support member 50 is secured on the block 44. The supporting member 50 is of substantially channel shape and is provided with opposed flanges 52 which extend vertically and which are connected by a central connecting transversely extending portion 54. End walls 56 are connected to the central connecting wall 54 and are connected at their upper end to a curvilinear resilient retainer member 58. The other end of the retainer member 58 is secured to the central connecting portion 54 as by welding or soldering as desired.

A frame of channel configuration 60 is secured to the front end of the body of the truck by screws or the like and is further provided with transverse brace bars 62. Extending upwardly from the top of the frame 60 and rigidly secured thereto is a substantially U-shaped clip 64 for a purpose to be henceforth explained. A drawbar 66 having a hook at its rearmost end designated by reference numeral 68 is secured to the truck body.

The hook 68 is adapted to engage within an aperture in a draft plate 70 which is secured to a tongue 72 of the trailer 12. The tongue 72 is secured to the body 74 of the trailer and is slidably emplaced therethrough. An aperture 76 is provided through the trailer body 74 so that a T-shaped pin 78 may selectively be emplaced through the aperture 76 and any one of the several apertures 80 extending through the tongue 72. Thusly the tongue 72 may be slid into any one of several positions relative to the truck body so as to adapt the trailer to carry loads of any desired size within certain limits and to reduce the necessary storage space for the entire unit when it is desired to store the toy away.

Glued or elsewise secured to the trailer body 74 is a block 82 to which is attached by means of screw 84 and washer 86 a supporting member 88 formed of a channel member having upwardly extending flanges 90 and a central connecting portion 92 abutting the vertically extending walls 90 and secured thereto and to the central portion 92 are end walls 94 which have at their upper ends connected thereto curvilinear resilient retainers 96 which are secured at their lower ends to the central portion 92 as by soldering. The entire supporting member 88 is mounted so as to be pivotally supported by the trailer body 74.

A U-shaped frame 98 is suspended by means of screws 100 below the trailer body 74. By means of bolts 102 a member simulating the leaf springs of a conventional trailer truck is pivotally secured to the frame member 98 and is designated by a reference numeral 104. A pair of axles 106 are rigidly mounted between the simulated leaf spring members 104 and are secured thereto by suitable cotter pins or the like (not shown). Double wheels of suitable configuration and appearance to simulate trailer tires and designated by reference numeral 108 are journaled on the axles and held thereon by suitable caps.

When the truck is in its operative position as shown in Figure 1 and has a load thereon extending between the members 50 and 88, when pulled by a child or other person the load will tend to rotate the members 50 and 88 an amount proportional to the angular displacement of the truck relative to the trailer.

The truck is further provided with a pair of spaced cross bars 110 which extend transversely across the truck body 26. When it is desired to store the toy, the trailer is merely lifted into the position as shown in Figure 2 with the tongue slid into a desired position within the body 74, with the wheels supported by the cross bars 110, while abutting against the truck body 26, and with the tongue 72 resting in the clip 64.

Since from the foregoing, the construction and advantages of this toy log truck and trailer are readily apparent, further description is believed to be unnecessary.

However since numerous modifications will readily occur to those skilled in the art after a consideration of the foregoing specification and accompanying drawings, it is not intended to limit the invention to the precise embodiment shown and described, but all suitable modifications and equivalents may be resorted to which lie within the scope of the appended claim.

Having described the invention, what is claimed as new is:

A combination of a logging truck comprising a truck body supported by a truck chassis with a trailer comprising a trailer body supported by a wheeled trailer chassis, log supporting means pivotally secured to said truck body and to said trailer body, said log supporting means being adapted to pivot relatively to the angular displacement of the truck relative to the trailer, said log supporting means comprising U-shaped members each having parallel end walls and a central connecting transverse member and curvilinear retainers terminally connected to the upper end of said end walls and to the central portion of said transverse member, a pair of spaced parallel cross bars transversely secured to said truck body on opposing sides of said log-supporting means, said chassis of said trailer being positionable over said log supporting means secured to said truck body, the wheels of the chassis of the trailer being engageable and supportable by said cross bars to substantially retain the trailer from movement relative to said truck, and means secured to said truck body at the forward portion thereof for supporting the tongue of said trailer.

ENNO J. DORNATH.

REFERENCES CITED

The following references are of record in the file of this patent:

UNITED STATES PATENTS

| Number | Name | Date |
| --- | --- | --- |
| 2,001,839 | DeBou et al. | May 21, 1935 |
| 2,094,836 | Clark | Oct. 5, 1937 |
| 2,112,201 | Larison | Mar. 22, 1938 |
| 2,233,697 | Freitag | Mar. 4, 1941 |
| 2,265,513 | Coote et al. | Dec. 9, 1941 |